Patented July 1, 1930

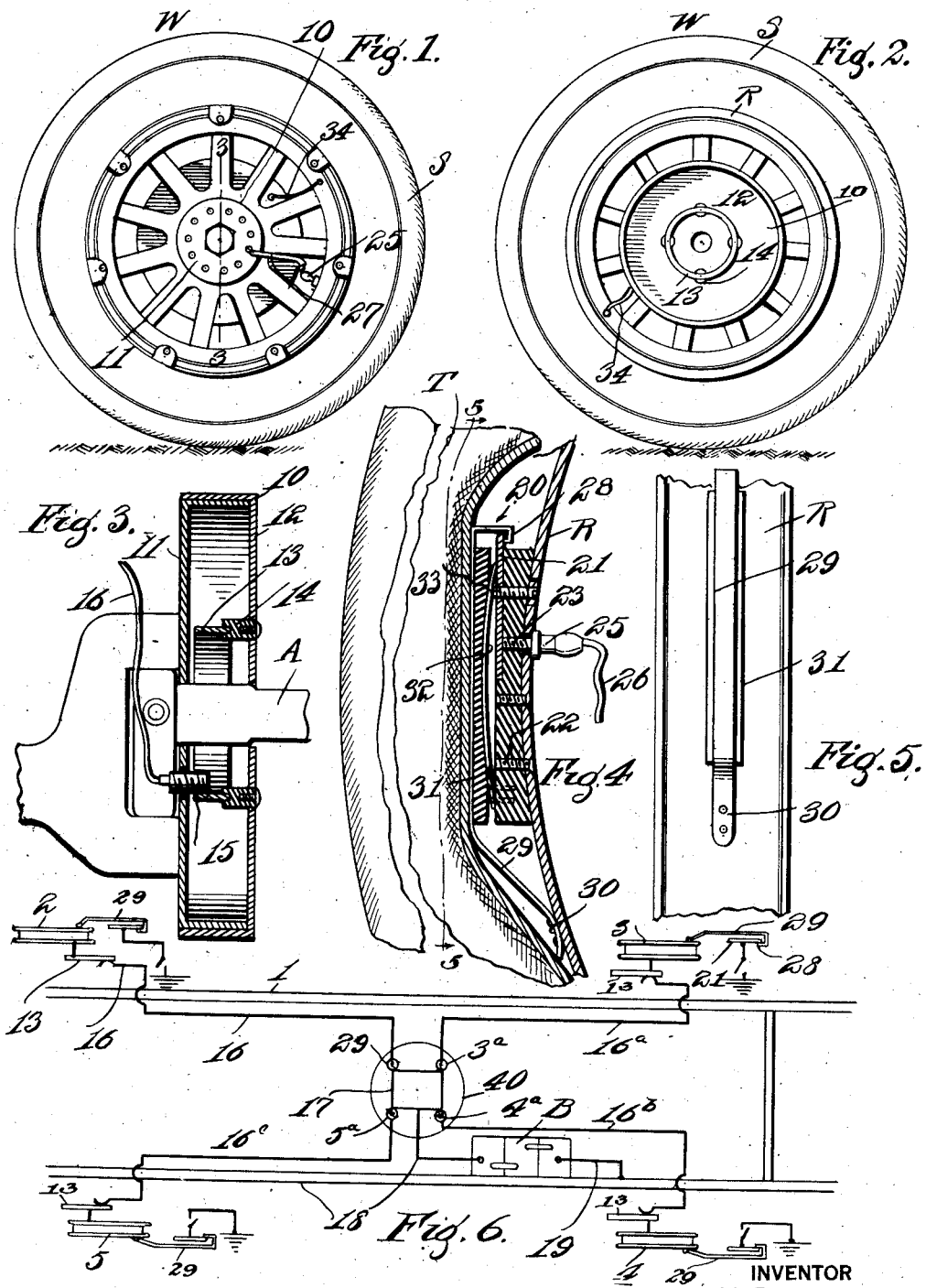

1,769,427

UNITED STATES PATENT OFFICE

JOHN B. GARSIDE, OF TONOPAH, NEVADA, ASSIGNOR OF ONE-HALF TO M. E. NEISH, OF TONOPAH, NEVADA

TIRE-DEFLATION SWITCH

Application filed June 7, 1928. Serial No. 283,556.

This invention relates to an indicating alarm system for use in connection with vehicles having pneumatic tires whereby a flat tire will be immediately indicated, as well as the location of the particular tire.

A primary object of the invention is to provide a simple and efficient device which will automatically notify the user of the vehicle that he has a flat tire, or one that is partially deflated.

Another object is to so construct a device of this character, the signalling mechanism of which is located at a convenient point, preferably on the instrument board of the car and the signals of which will be brought respectively into play according to the tire deflated and when one of the signals is inoperative by burning out of a bulb or otherwise the others will not be affected.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a side elevation of a vehicle wheel with this improved device applied;

Fig. 2 is a similar view from the opposite inner side of the wheel;

Fig. 3 is a transverse section taken on the line 3—3 of Figure 1;

Fig. 4 is a detail longitudinal section through the wheel rim and tire;

Fig. 5 is a section taken on the line 5—5 of Fig. 4; and

Fig. 6 is a diagrammatic view of the electric circuit used in connection with the four wheels of the vehicle, which are shown individually in Figs. 1 and 2 and which include the usual casing or shoe S equipped with an inner tube T and having a metal rim R, one of the axles being shown at A in Fig. 3.

Each wheel is equipped with a brake drum 10 four of which are indicated at 2, 3, 4 and 5 in Fig. 6 the vehicle frame being shown at 1. Each brake drum comprises a fixed member 11 and a rotatable member 12 the latter being equipped with a metal ring 13 preferably composed of copper and which is insulated from the movable member 12 of the brake drum by insulators 14 carried by said member 12. A distributing brush or roller 15 engages the inner face of the ring 13 and has a conducting wire 16 connected therewith which leads to a conductor wire 17 which wire 17 engages four signals in the form of electric light bulb $2^a$, $3^a$, $4^a$ and $5^a$, said bulbs being connected respectively with the various wheel brake drums shown at 2, 3, 4, and 5. This wire 17 is connected by a conductor 18 with a battery B mounted on the frame 1 and which battery is grounded by wire 19 with the vehicle frame as is shown clearly in Fig. 6.

The electric light bulbs $2^a$, $3^a$, $4^a$, and $5^a$ shown in Fig. 6 and with which the wire 17 contacts are supplied with current from this wire and when the circuit is closed by the deflation or partial deflation of a tire the light corresponding to the wire will be lit. If, for any reason one of these light bulbs should burn out it will not affect the other owing to the connection of the wire 17 with them.

Arranged on the outer face of each wheel rim R between the rim and the inner tube T, as shown clearly in Fig. 4, is arranged a switch 20 comprising a metal plate 21 secured to the rim R by a plurality of bolts $22^a$ insulated from said rim and between which rim and the plate is arranged a block of insulated material 22. A socket 23 is attached to the plate 21 and extends through the block 22 and the rim R being insulated from the latter and is adapted to receive a plug 25 which can be pulled out to permit the changing of tires, the conducting wire 26 of which passes through a copper tube 27 which grounds the wires to the hub of the wheel.

The contact 21 cooperates with a movable contact 28 made in the form of a hook carried by one end of a metal strip 29 which is secured at its other end to the rim R as shown at 30 in Figs. 4 and 5. An insulating strip 31 is arranged on the inner face of the strip 29 and between said strip 29 and the block 22 is a leaf spring 32 which normally exerts its tension to force the contact plate 29 away from the plate 21 thereby causing the hooked end of said contact, as shown at 28, to engage the contact 21 and close the circuit. This obviously occurs when tire T is deflated and this closing of the switch operates to light the signal bulb on the dial or instrument 40 located on the dash board or instrument board of the automobile. When the tube T is inflated it presses against the switch member 29 forcing it inward against the tension of spring 32 and thereby separating the contacts 21 and 28 thus breaking the circuit and putting out the light connected with the contact 21.

An adjusting screw 33 extends through the rim R being insulated therefrom as shown at 33ª. It also extends through the block 22 and engages one end of the spring 32 being adjustable to vary the tension of this spring which is designed to resist any desired number of pounds of pressure prior to the closing of the switch.

When the tire becomes deflated or the pressure reduced spring 32 forcing the strip 29 and contact member 28 outward will cause the contacts 28 and 21 to engage and light the bulb on the instrument board. Then when the wheel revolves and the portion of the tire opposite this switch engages the ground obviously the weight of the wheel and vehicle will release the switch opening it and thus causing a flickering or flashing light to be produced at the instrument board and thereby attract the attention of the driver to the fact that the tire needs attention.

A conductor wire 34 is grounded at one end on the rim R as shown clearly in Fig. 1 and its other end attached to the insulated brass ring 13 within the brake drum.

It will thus be seen that a vehicle equipped with this electrically operated alarm will be comparatively free from breaking down of the tire walls incident to running on soft or flat tires. It will also be obvious that the wires may be placed in a loom and taken off as needed, the dash instrument being designed to suit the make of car in connection with which it is to be used.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

A circuit closer for a pneumatic tire alarm comprising a fixed contact to be mounted on the outer face of a wheel rim and to be insulated therefrom, a movable contact in the form of a metal strip for attachment at one end to a wheel rim and overlying the fixed contact and having a hook at one end positioned to engage one end of the fixed contact when the movable contact is moved outward, a spring for normally forcing said movable contact outward, said spring being compressible by the pressure in the tire to permit the contacts to be moved out of engagement with each other and open the circuit.

JOHN B. GARSIDE.